United States Patent

Huffstetler

[15] 3,636,778
[45] Jan. 25, 1972

[54] METHOD AND MEANS FOR DIMENSIONAL INSPECTION OF TUBING

[72] Inventor: Richard O. Huffstetler, Bethel Park, Pa.
[73] Assignee: The United States of America as represented by the United States Atomic Energy Commission
[22] Filed: June 5, 1970
[21] Appl. No.: 43,709

[52] U.S. Cl. ............................................................73/67.8 R
[51] Int. Cl. .......................................................G01n 29/00
[58] Field of Search ..........................73/67.5, 67.7, 67.8, 67.9

[56] References Cited

UNITED STATES PATENTS 3,485,087  12/1969  Brech.....................73/67.9 X
3,470,868  10/1969  Krause et al..........................73/67.8 S Primary Examiner—James J. Gill
Assistant Examiner—Arthur E. Korkosz
Attorney—A. T. Stratton, Z. L. Dermer and M. B. L. Hepps

[57] ABSTRACT

A dual transducer probe is rotatably driven through tubing in order to measure and record the inside diameter, ovality, wall thickness, wall eccentricity and outside diameter of same. A first transducer is connected to a timing device which is started by the transmission of a pulse generated by the first transducer and stopped by the reception of the reflected energy from the inside wall of the tubing. A second clock or timing device is also connected to the first transducer which is started by the reception of the reflected energy from the inside surface of the pipe and stopped by the reception of reflected energy from the outside surface of the pipe. A second transducer is connected to still another timing device which is started by the transmission of a pulse from same and stopped by the reception of this pulse from the inside surface of the tubing. The elapsed time on the various timing devices, suitably converted to electrical voltages, are added in the case of the first and third timing devices in order to measure the inside diameter and ovality of the tubing; and the elapsed time on the second timing device may be recorded to indicate the thickness and eccentricity of the tubing.

1 Claims, 5 Drawing Figures

PATENTED JAN 25 1972 3,636,778

INVENTOR
RICHARD O. HUFFSTETLER

BY
ATTORNEY

METHOD AND MEANS FOR DIMENSIONAL INSPECTION OF TUBING

The invention described herein was made under contract AT(11-1)B-GEN-14 with the U.S. Atomic Energy Commission.

BACKGROUND OF THE INVENTION

This invention relates to techniques for the dimensional inspection of tubing and more particularly to an ultrasonic technique for same.

Currently in order to measure the inside diameter, ovality, wall thickness, wall eccentricity and outside diameter of tubing, a multiplicity of time-consuming techniques and devices are needed. Among the tests now run are air gauge inspection, wall thickness measurements, plug gauging and others. These techniques although accurate are extremely time consuming and the test on all the tubing necessary, for example, in a steam generator, can consume a substantial period of time.

SUMMARY OF THE INVENTION

The time period required for the aforementioned inspection of tubing can be minimized in accordance with this invention by the provision of a dual transducer probe which is rotatably driven through the tubing and connected to a plurality of timers.

Two transducers are suitably used in this technique. A first transducer is connected to a first and second timer and a second transducer is connected to a third timer. The generation of an impulse by the first transducer starts the first timer and the reflected energy from the generated wave front at a water to inside diameter interface, when received, stops the first timer. The second timer is started by the reception of this pulse and is stopped by the reception at a pulse from the outside surface to water interface. The third timer is started by the transmission of a pulse simultaneous to the transmission of the pulse from said first transducer and is stopped by the reception of the reflected wave front from the inside diameter to water interface.

Elapsed times, as measured on timers one and three, are added, and when converted to suitable voltage, may be recorded and calibrated to give the inside diameter and ovality of the tubing. The elapsed time, converted to a voltage, on the second timer may be recorded and when suitably calibrated indicates the thickness and eccentricity of the tubing. The inside diameter and thickness may, if desired, be added to give the outside diameter of the tubing. Two transducers may be connected to a probe extension so as to generate wave fronts perpendicular to probe extension so as to generate wave fronts perpendicular to the wall of the tubing. The probe extension may be connected to a nylon guide device which desirably has an outside diameter equal to the inside diameter of the tubing to be inspected. The probe is suitably connected to a coaxial cable which allow it to be driven through the tubing while being rotated so that the transducers describe a helical path while passing through the tubing so as to effectuate 100 percent inspection of same.

DESCRIPTION OF THE DRAWINGS

For a better understanding of the invention, reference may be had to the accompanying drawings which show an exemplary embodiment of the invention, in which.

DESCRIPTION OF A PREFERRED EMBODIMENT

This invention operates on the principle of first-generating ultrasonic beams or wave fronts in a water media and electronically measuring the time required for these wave fronts of energy to reach boundaries or interfaces having different acoustical properties. It is recognized that ultrasonic wave fronts will travel at a constant speed within a given material until it reaches a boundary or interface having different acoustical properties. At this interface, a portion of the traveling ultrasonic wave front will be reflected back along the same path to the generating transducer. The percent of reflected energy is proportional to the impedance mismatch of the two materials making up the interface.

Figure 1:
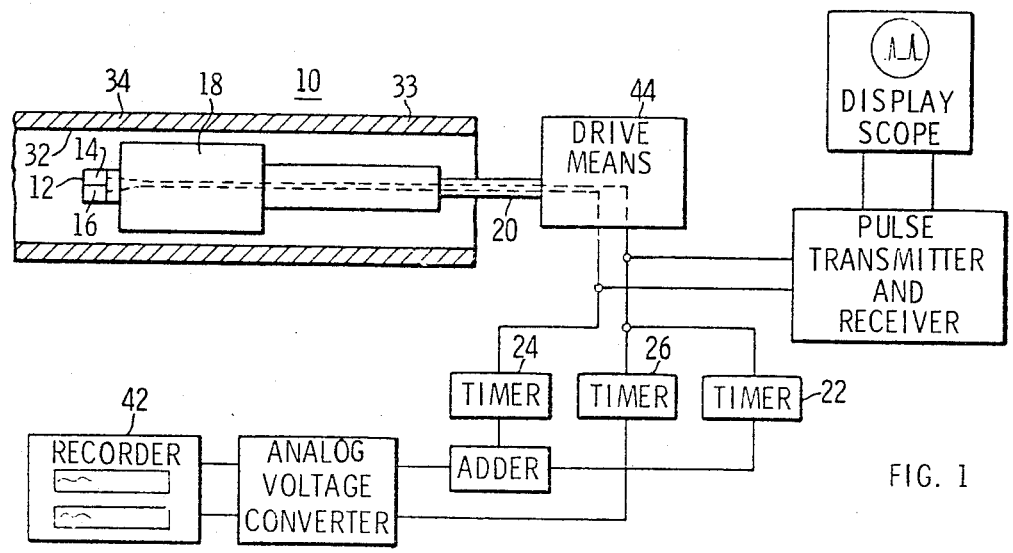
FIG. 1 shows a suitable ultrasonic probe and accompanying electrical apparatus for measuring and recording the desired dimensions of tubing.

FIG. 1 shows a suitable ultrasonic probe for practicing this invention designated by the numeral 10. The ultrasonic probe 10 consists of a probe extension 12 which mounts two transducers, 14 and 16. Probe extension 12 is preferably connected to a nylon guide device 18 which is in turn connected to a coaxial cable 20.

Figure 2:
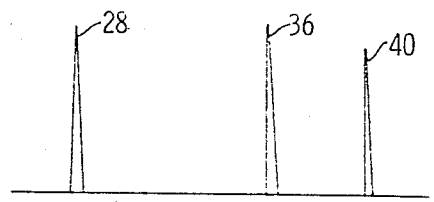
FIG. 2 shows a time axis trace of a typical ultrasonic pulse train from a first transducer.
Figure 3:
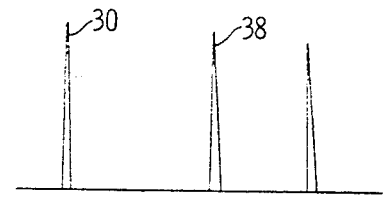
FIG. 3 shows a typical trace of an ultrasonic pulse train similar to FIG. 2 for a second transducer.

The piezoelectric transducer 14 is connected to a timing device 22 and a timing device 26. The piezoelectric transducer 16 is connected to another timing device 24. The transducers 14 and 16 are preferably oriented 180° apart. In accordance with this invention, both transducers 14 and 16 are simultaneously pulsed by a pulse generator 17. Two electrical spikes 28 and 30 in FIGS. 2 and 3, respectively, which are provided to pulse the transducers 14 and 16, respectively, also activate the timing devices 22 and 24, respectively. The timing devices 22 and 24 run while the wave fronts proceed through the water along a tube diameter to the first water to metal interface at the inside surface 32 of the pipe 33. At the interface 32 a portion of the energy is reflected back along the same path towards the transducers 14 and 16 while the remaining energy continuous through the metal wall and is reflected from the outer wall 34; which is also preferably a metal to water interface. The energy received from the first metal to water interface 32 turns off the timing devices 22 and 24. Returned energy to the transducer 14 also simultaneously activates the remaining timing device 26 associated with the transducer 14. The returned energy to the transducers 14 and 16 are shown and are indicated by spikes 36 and 38 in FIGS. 2 and 3, respectively. The returned energy from the outer wall interface 34 turns off timing device 26 and is shown in FIG. 2 by a spike 40.

The total round trip time of the wave fronts from transducers 14 and 16 are added by suitable electronic means, well known in the art, and converted to an analog voltage, which is used to drive a strip chart recorder; indicated in the drawings by the numeral 42. The total round trip time is the time between pulses 28 and 36 in FIG. 2 and pulses 30 and 38 in FIG. 3. The time between peaks 36 and 40 in FIG. 2 is the round trip time of a pulse through the tube wall and it is in a like manner converted to an analog voltage which drives a second pen on strip chart recorder 42.

As should now be apparent, the placement of the probe 10 with respect to the centerline of the tube undergoing tests does not effect the results since the added time between spikes 28 and 36 plus 30 and 38 represent approximately twice the diameter of the pipe regardless of the placement of the probe, and the time between spikes 36 and 40 represent twice the thickness of the tube also regardless of the placement of the transducer 14.

Figure 4:
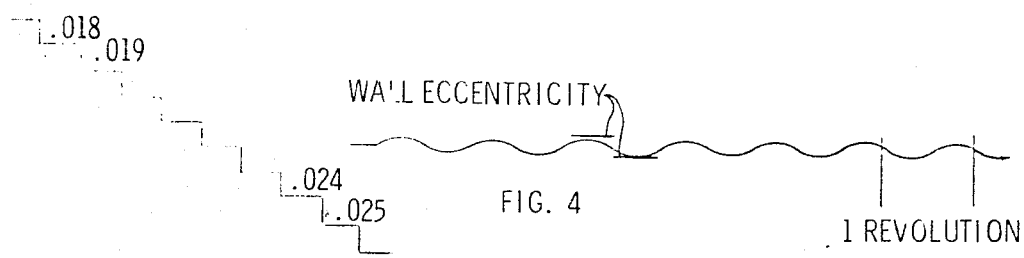
FIG. 4 shows a typical strip chart recording of the wall thickness as measured by the probe.
Figure 5:
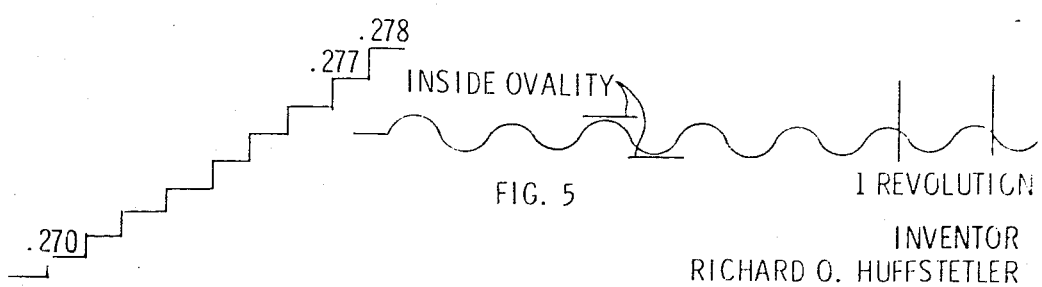
FIG. 5 shows a typical recording of the tube inside diameter measurements as measured by the probe.

FIGS. 4 and 5 show typical strip chart recordings on recorder 42. In FIG. 4, the added times for the wave fronts from transducers 14 and 16 to reach the inside metal to water interface 32 and return are added, converted to an analog voltage, and recorded. As is well known to worker's in the art, the record in FIG. 4 may be easily converted to an accurate representation of the inside diameter and ovality of a tube under test by running a plurality of test on tubes of known inside diameter and ovality. Such a calibration standard may be conveniently manufactured by reaming "steps" from the inside of a tube similar to that to be tested. In FIG. 4, a typical calibration standard is shown on the left-hand side of the Figure. It should be noted that the ovality is represented by the distance between wave tops and wave troughs and that the difference between wave tops measured along a time axis represents one revolution of the probe 10 as shown. In a similar manner the wall thickness recording is shown in FIG. 5 and is calibrated in the same manner; by running a plurality of tests on tubes of known thickness. Here the distance between a wave top and wave trough measured vertically represents wall eccentricity and the distance between wave tops represents a revolution of the probe 10 as indicated thereon.

As previously indicated, a test on a tube is run by driving the probe 10 through the length of the tube while rotating same. Suitable commercial devices for driving the probe 10 along the tube while rotating same are well known to worker's in the art and represented in FIG. 1 by a device 44.

I claim as my invention:

1. An ultrasonic apparatus for dimensional inspection of tubing, and the like, comprising in combination:

a pulse generator; a first transducer pulsed by said pulse generator, adapted for the transmission and reception of ultrasonic energy, and oriented within the tubing for the transmission of a pulsed wave front perpendicular to the wall of said tubing;

a first timing device electrically connected to said first transducer so as to be started by the transmission of a pulsed wave front and stopped by the first reception of reflected energy from the tubing;

a second timing device electrically connected to said first transducer so as to be started by said first reception of reflected energy and stopped by the second reception of reflected energy from the tubing;

a second transducer pulsed simultaneously with said first transducer by said pulse generator and oriented within the tubing for the transmission of a pulsed wave front perpendicular to the wall of said tubing and further oriented with respect to said first transducer so as to transmit wave fronts in a direction 180° from the direction of the wave fronts from said first transducer;

a third timing device connected electrically to said transducer, said third timing device being started by the transmission of said initial pulse and stopped by the reception of the first reflected energy;

an elapsed time summing device electrically connected to the first and third timing devices to add their measured intervals indicating the inside diameter and ovality of the tubing;

the elapsed time of the second timing device indicating the thickness and eccentricity of the tubing; and means for translating and simultaneously rotating the transducers throughout the length of the tubing.

* * * * *